US009742512B2

(12) United States Patent
Smetana et al.

(10) Patent No.: US 9,742,512 B2
(45) Date of Patent: Aug. 22, 2017

(54) BROADCAST CONTENT PREVIEW NOTIFICATION IN WIRELESS COMMUNICATION NETWORKS

(75) Inventors: Karen L. Smetana, Chicago, IL (US); Jerome O. Vogedes, Milwaukee, WI (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 512 days.

(21) Appl. No.: 11/460,709

(22) Filed: Jul. 28, 2006

(65) Prior Publication Data

US 2008/0046909 A1 Feb. 21, 2008

(51) Int. Cl.
*H04N 7/173* (2011.01)
*H04H 60/66* (2008.01)
*H04H 60/68* (2008.01)

(52) U.S. Cl.
CPC ............. *H04H 60/66* (2013.01); *H04H 60/68* (2013.01); *H04H 2201/40* (2013.01)

(58) Field of Classification Search
CPC ..... H04H 60/66; H04H 60/68; H04H 2201/40
See application file for complete search history.

(56) References Cited

U.S. PATENT DOCUMENTS 6,526,575 B1* 2/2003 McCoy et al. .................. 725/36
6,725,461 B1* 4/2004 Dougherty et al. ............ 725/40
6,802,077 B1* 10/2004 Schlarb .................. H04N 7/165 348/E5.006
6,937,950 B2* 8/2005 Cragun et al. .................. 702/71
7,389,523 B2* 6/2008 Kikinis ........................... 725/46
2002/0059620 A1* 5/2002 Hoang ............................ 725/87
2003/0005447 A1* 1/2003 Rodriguez ......... H04N 7/17318 725/51
2003/0079008 A1 4/2003 Fujii et al.
2003/0088778 A1* 5/2003 Lindqvist et al. ............ 713/182
2005/0085220 A1 4/2005 Benco et al.
2005/0107035 A1 5/2005 Zoeckler
2005/0144635 A1* 6/2005 Boortz ............... H04N 5/44543 725/32
2006/0019618 A1* 1/2006 Seppala ................. H04H 60/72 455/121
2006/0019702 A1* 1/2006 Anttila ............. H04M 1/72547 455/556.1
2006/0053450 A1* 3/2006 Saarikivi et al. ............... 725/46
2006/0167903 A1* 7/2006 Smith et al. .................. 707/100
2006/0174274 A1* 8/2006 Vance et al. ..................... 725/45
2006/0189300 A1* 8/2006 Hwang et al. ............. 455/412.2
(Continued)

FOREIGN PATENT DOCUMENTS

WO 2005045603 A2 5/2005

OTHER PUBLICATIONS

OMA Open Mobile Alliance, Service Guide for Mobile Broadcast Services, Draft Version 1.0, Mar. 24, 2006, pp. 1-168.*
(Continued)

*Primary Examiner* — Nathan Flynn
*Assistant Examiner* — Alfonso Castro
(74) *Attorney, Agent, or Firm* — Lowenstein Sandler LLP

(57) ABSTRACT

A system including a wireless communication network entity and a wireless terminal having a broadcast receiver for receiving content. The network entity is, for example, a broadcast content provider and/or a wireless communication network. A process includes sending preview information to the terminal wherein the preview information references content not yet received by the wireless terminal, and sending expiration notification information metadata for the content referenced by the preview information wherein the expiration notification metadata enables presentation of content expiration information on a user interface of the terminal.

20 Claims, 4 Drawing Sheets

(56) References Cited

U.S. PATENT DOCUMENTS

| | | | | |
|---|---|---|---|---|
| 2007/0107016 | A1* | 5/2007 | Angel et al. | 725/61 |
| 2007/0168539 | A1* | 7/2007 | Day | 709/231 |
| 2007/0245378 | A1* | 10/2007 | Svendsen | 725/46 |
| 2008/0109528 | A1* | 5/2008 | Knight et al. | 709/217 |
| 2009/0241144 | A1* | 9/2009 | LaJoie et al. | 725/40 |
| 2010/0014661 | A1* | 1/2010 | Terekhova et al. | 380/42 |
| 2011/0162090 | A1* | 6/2011 | Fish | 726/30 |

OTHER PUBLICATIONS

OMA Open Mobile Alliance, Mobile Broadcast Services Architecture Draft Version 1.0-20 04, 2005, pp. 1-88.*

OMA-TS-BCAST Service Guide—V1 0 0-2006324-D.

OMA-TS-BCAST Service Guide—V1 0 0-20060324-d-TRACKED.

OMA, Mobile Broadcast Services Architecture, Candidate Version 1.0—May 29, 2007, OMA-AD-BCAST-V1_0-2007-0529-C, pp. 1-70.

OMA, Mobile Broadcast Services Requirements, Candidate Version 1.0—May 29, 2007, OMA-RD-BCAST-V1_0-20070529-C, pp. 1-118.

OMA, Mobile Broadcast Services Architecture, Approved Version 1.0—Feb. 12, 2009, Open Mobile Alliance, OMA-AD-BCAST-V1_0-20090212-A, pp. 1-109.

OMA, Mobile Broadcast Services Requirements, Approved Version 1.0—Feb. 12, 2009, Open Mobile Alliance OMA-RD-BCAST-V1_0-20090212-A, pp. 1-65.

International Search Report and Written Opinion mailed on Nov. 27, 2007, on application No. PCT/US2007/073299.

* cited by examiner

BROADCAST CONTENT PREVIEW NOTIFICATION IN WIRELESS COMMUNICATION NETWORKS

FIELD OF THE DISCLOSURE

The present disclosure relates generally to wireless communications and, more particularly, to broadcast content preview information in wireless communication networks, corresponding entities and methods.

BACKGROUND

Proposed Digital Video Broadcast Handheld (DVB-H) mobile wireless broadcast service protocols, for example, the Open Mobile Alliance (OMA) BCAST protocol and the competing DVB-Convergence Broadcast and Mobile Service (CBMS) protocol, both implement an Electronic Service Guide (ESG) that provides information regarding available broadcast services to mobile terminal users. The ESG information generally comprises text and/or image fragments that exist independently.

The Open Mobile Alliance (OMA) Technical Specification, at Section 5.2.2.9, specifies that the Electronic Service Guide (ESG) contains metadata tags used by mobile terminals to present preview data. The preview data may be a short video clip preview or other information referencing content that may be purchased or otherwise obtained by the user. The preview data may also reference other services, for example, a low bit rate version of a relatively high quality service. The preview data is generally presented to the user when browsing a service description in the ESG. The preview data may also be presented when checking subscription or charging information for a specific service, or when switching to a specific broadcast channel. The ESG may also include preview data expiration information that indicates when the preview data expires.

The various aspects, features and advantages of the disclosure will become more fully apparent to those having ordinary skill in the art upon careful consideration of the following Detailed Description and the accompanying drawings described below. The drawings may have been simplified for clarity and are not necessarily drawn to scale.

DETAILED DESCRIPTION

Figure 1:
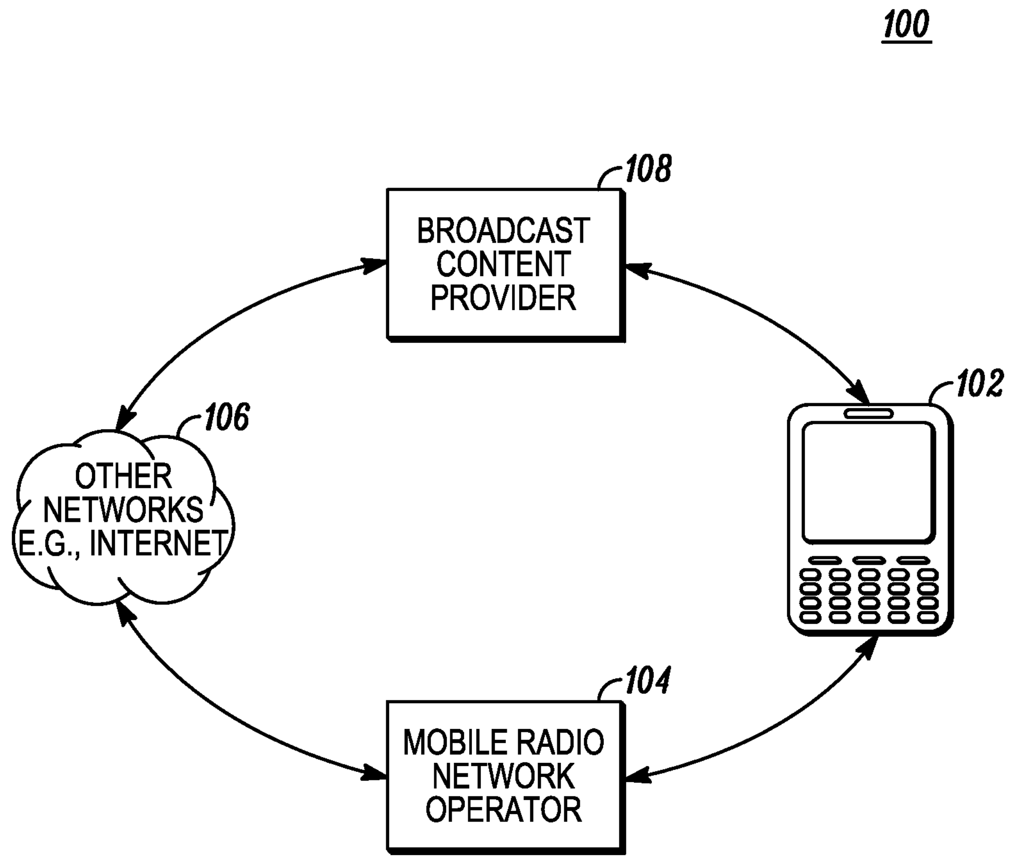
FIG. 1 is a wireless communication system.

In FIG. 1, a wireless communication system 100 comprises generally a wireless terminal 102 that communicates in a wireless communication network 104, for example, in a cellular communication network, which may be communicably coupled to other networks. In FIG. 1, for example, the wireless communication network is communicably coupled to the Internet and/or some other open or proprietary network(s) 106. The architecture of wireless communication networks is known generally and thus not discussed in further detail. Exemplary cellular communication networks include 3GPP GERAN based networks, for example, GSM/

EGPRS and Enhanced Data-rates for GSM (or Global) Evolution (EDGE) networks, CDMA networks and 3rd Generation 3GPP WCDMA and 3GPP2 CDMA networks, among other existing and future generation cellular communication networks.

In FIG. 1, the wireless communication system also includes a wireless broadcast service content provider 108, for example, a DVB-H broadcast network operator. The content service provider 108 broadcasts content for reception by wireless terminals capable of receiving such broadcasts. In some embodiments, the wireless terminal is configured with a broadcast receiver, for example, a DVB-H receiver. Users typically subscribe to broadcast services, although service subscription is generally not required. The integration of broadcast and wireless communication networks is known generally and thus not discussed in further detail.

Figure 2:
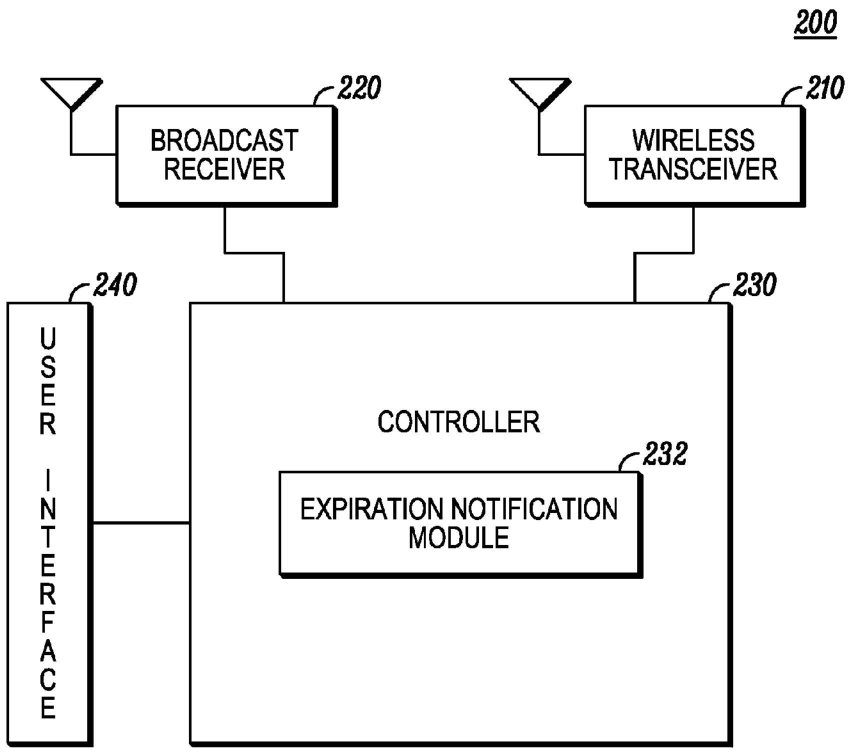
FIG. 2 is a wireless communication terminal capable of broadcast service reception.

In FIG. 2, the wireless terminal 200 includes a wireless, e.g., a cellular, transceiver 210 and a broadcast receiver 220, e.g., DVB-H receiver, both of which are communicably coupled to a controller 230. The terminal also includes a user interface 240 communicably coupled to the controller. The user interface may comprise a video display, a keypad or other input device, audio inputs and outputs, and corresponding controls among other inputs and outputs. The wireless terminal typically includes other inputs and outputs known generally by those having ordinary skill in the art and thus not illustrated in the drawing. In some embodiments, the wireless terminal includes a broadcast receiver but not a wireless communication transceiver.

Figure 3:
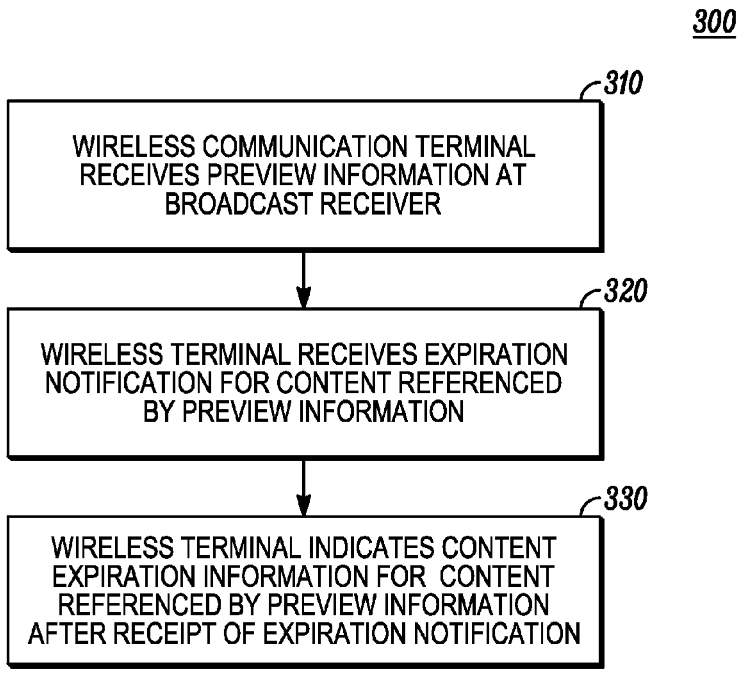
FIG. 3 is a process flow diagram.

In the process 300 of FIG. 3, at 310, a wireless terminal including at least a broadcast content receiver, for example, the terminal 200 of FIG. 2, receives preview information at the broadcast content receiver. Thus the preview information is sent via the content provider, for example, the broadcast content provider 108 in FIG. 2. In one embodiment, the preview information is sent as part of, or is referenced, by an Electronic Service Guide (ESG).

The preview information references content not yet received by the wireless terminal. The preview information may be in the form of a preview video clip or trailer or some other promotional information that references content that may be purchased or otherwise obtained by the user. The content referenced may be multimedia content, e.g., audio and/or video, polls, games, or any other type of content. The terminal user typically views the preview information to decide whether to download or otherwise obtain the referenced content. The downloading may be performed at prescribed time periods or it may be performed on-demand. In some embodiments, the referenced content is provided by the broadcast service provider and received by the broadcast receiver on the wireless terminal. In other embodiments, the content is obtained from some other source. For example, the referenced content may be obtained from a third party content provider via the wireless communication transceiver. In some but not all embodiments, the terminal user exchanges some consideration for right to obtain the referenced content. The consideration exchanged may be monetary, e.g., account billing, or it may be information, e.g., an e-mail address, provided to the content provider.

In one embodiment, the wireless terminal communicates or negotiates with the content provider to obtain the referenced content. In other embodiments the communication or negotiation is made via a proxy entity. In FIG. 2, for example, a request for the referenced content may be communicated to the content provider via the broadcast content provider 108 or it may be communicated via the mobile radio network operator 104.

In some embodiments, the referenced content has an expiration time associated with it. For example, the temporal availability of the content or something associated with the referenced content may be limited. In some embodiments, content availability may be based on a promotional event. For example, the referenced content may be available at a particular price for a limited time period. In another example, bonus content may be provided if the referenced content is purchased within a specified time period. In another embodiment, the time period during which a user may respond to a poll or participate in a survey or play a game may be limited. Thus, generally, the availability of the reference content or something associated therewith may be discontinued after a specified time period.

In FIG. 3, at 320, according to a related aspect of the disclosure, the wireless terminal receives an expiration notification for content referenced by preview information. In one embodiment, the expiration notification is received by the communication transceiver from the content service provider, for example, from the broadcast content provider 108 in FIG. 1. In a related embodiment, the broadcast content expiration notification is communicated to the wireless terminal in the Electronic Service Guide as part of a metadata tag. In some embodiments, the expiration information includes URI or other address information indicating from where the content may be obtained, for example, from a third party content provider.

In another embodiment, the expiration notification is received by the communication transceiver from a wireless communication network other than the content service provider. For this embodiment, in FIG. 1, the mobile radio network operator 104 transmits the expiration notification to the wireless terminal 102, which receives the expiration notification via a wireless receiver rather than by the broadcast receiver. The expiration notification may be sent to the wireless terminal via a message, for example, a short message service (SMS) message or a multimedia message service (MMS) message or an instant message (IM). Generally, the expiration notification may be communicated in a point-to-point communication or in a broadcast communication. In other embodiments, the expiration notification is communicated to the wireless terminal by some other mechanism.

In embodiments where the expiration notification is sent to the wireless terminal via a wireless communication network other than the content service provider, the content provider may communicate the expiration notification information to the wireless communication network for forwarding to the wireless terminal. In one embodiment, the broadcast content expiration notification is communicated to the broadcast client in the Electronic Service Guide as part of the PreviewData metadata tag via the cellular network or broadcast network. This notification to the broadcast client may also be communicated to the end user over a cellular messaging application, e.g., via SMS, MMS. In one embodiment, the wireless communication network receives content expiration notification information for broadcast content available to communication terminals in the wireless communication network from the content provider. The wireless communication network then sends a content expiration notification, based on the content expiration notification information, to one or more communication terminals over the wireless communication network. In one embodiment, the content expiration notification is pushed to the communication terminal in the absence of a request from the communication terminal.

In FIG. 3, at 330, the wireless terminal indicates, on a user interface thereof, content expiration information for the content referenced by the preview information after receipt of the expiration notification. In one embodiment, the content expiration information is indicated automatically, preferably before the content referenced by the preview information expires. The content expiration notification may be in the form of a prompt reminding the user of the expiration of, or a last chance opportunity to obtain, the referenced content or a promotion or other information associated therewith. In some embodiments, the wireless terminal provides multiple content expiration information prompts associated with the expiration of the referenced content. The prompts may be based on receipt of a single expiration notification or on multiple notifications. In one embodiment, the frequency with which the multiple content expiration information prompts are presented at a user interface of the wireless terminal increases as the expiration time approaches, thus creating a sense of urgency for the user.

In the wireless communication terminal 200 illustrated in FIG. 2, the controller 230 includes an expiration notification module 232 that controls the presentation of the content expiration information or prompts on the user interface of the wireless terminal. The module generates content expiration prompts based on the expiration notification received by the wireless terminal. The module is typically implemented by software, although it may be implemented by an equivalent hardware circuits or modules or combination of hardware and software. In the process diagram 400 of FIG. 4, at 410, a wireless device user subscribed to a mobile broadcast content service is provisioned with a broadcast (BCAST) service capabilities/profile. The wireless terminal user may have the ability to activate or deactivate this capability through the service provider. This would likely include the subscription or device characteristics, etc. The profile and configuration is not an essential part of the invention. At 420, the content preview information along with metadata/ESG is transferred to the wireless device with content time/expiration window information.

Figure 4:
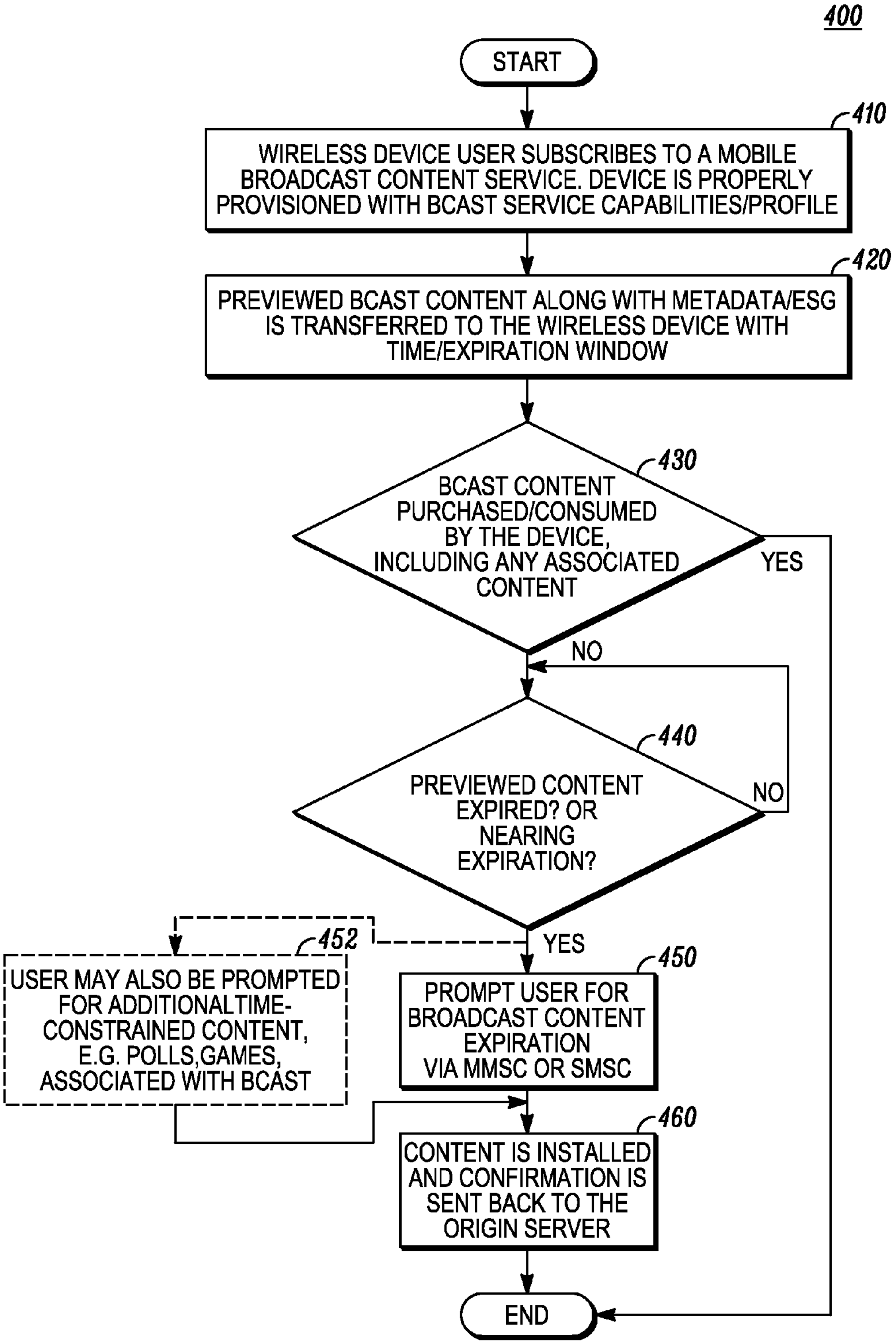
FIG. 4 is a process flow diagram.

In FIG. 4, at 430, BCAST content, including any associated content, is purchased or consumed by the wireless terminal. When content referenced by preview information is near expiration at 440, the user is prompted of the expiration based on the expiration notification, which may be received from the wireless communication network, for example, from the MMSC or SMSC or from the broadcast service provider. At 452, as an optional component of the expiration notification, the user may be prompted for additional time-constrained content such as polls, games, etc. At 460, the referenced content is installed if the user opts to download the content.

Figure 5:
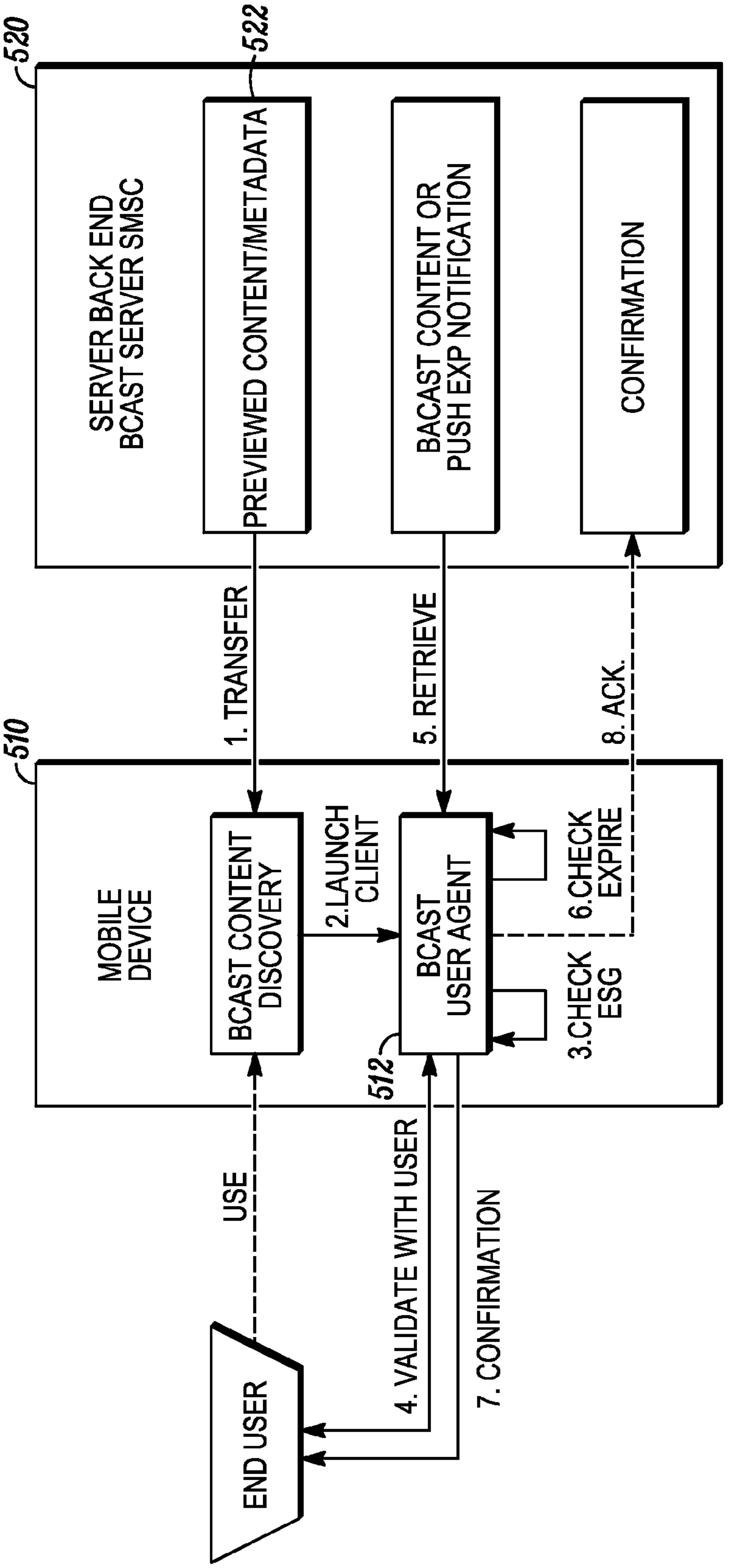
FIG. 5 illustrates a system including a mobile terminal and a broadcast network entity.

In FIG. 5, at step 1, a wireless terminal embodied as a mobile device 510 transfers preview content/metadata 522, for example, as part of an Electronic Service Guide (ESG), from a BCAST server 520. At step 2, the wireless terminal 510 launches a BCAST client application for decoding and processing the ESG with the PreviewData metadata. At step 3, a BCAST user agent 512 on the wireless terminal checks the ESG for validity, form and processes the metadata. Upon validation with the user at step 4, the preview information is viewed by the user. Step 5 illustrates an example of the network pushing an expiration notification to the device if the full broadcast content has not yet been purchased or consumed by the user. This is coming from the network source, e.g. broadcast server or cellular network. The broadcast client will check the expiration parameters and notify the user of the impending expiration in steps 6 and 7. The final step is to acknowledge receipt of the content if consumed by the device.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless terminal, the method comprising:

receiving, from a broadcast content provider, preview information referencing content not yet received by the wireless terminal and that is associated with bonus content that has limited availability;

receiving, from the broadcast content provider, an electronic service guide comprising expiration notification metadata for the content referenced by the preview information;

decoding and processing the electronic service guide to determine whether the electronic service guide is valid, wherein the preview information is not to be displayed via a user interface of the wireless terminal until the electronic service guide is decoded and determined valid;

receiving, via a wireless communication network, expiration window information corresponding to expiration of the limited availability of the bonus content;

determining the content referenced by the preview information has not been consumed or purchased and that the limited availability is nearing the expiration based on the expiration window information;

generating, based on the expiration notification metadata, a prompt indicating that the limited availability of the bonus content associated with the content referenced by the preview information is to expire in response to the determining the content referenced by the preview information has not been consumed or purchased and that the limited availability is nearing the expiration;

presenting the prompt on the user interface of the wireless terminal;

transmitting, via a proxy entity, a request for the content referenced by the preview information; and receiving the content referenced by the preview information and the bonus content in response to transmitting the request before the expiration of the limited availability.

2. The method of claim 1, wherein the wireless terminal comprises a communication transceiver, wherein the receiving of the electronic service guide comprising the expiration notification metadata for the content referenced by the preview information is at the communication transceiver via the wireless communication network, wherein the wireless communication network is not the broadcast content provider.

3. The method of claim 1, wherein the wireless terminal comprises a broadcast content receiver, wherein the receiving of the preview information is at the broadcast content receiver.

4. The method of claim 1 further comprising automatically indicating, on the user interface of the wireless terminal, the prompt after receipt of expiration notification based on the expiration notification metadata.

5. The method of claim 1 further comprising automatically indicating, on the user interface of the wireless terminal, the prompt before expiration of the availability of the content referenced by the preview information based on the expiration notification metadata.

6. The method of claim 1, the wireless terminal receiving the expiration notification metadata in form of any one of an instant message, multi-media messaging service or short messaging service message.

7. The method of claim 1 further comprising increasing frequency at which prompts are provided as the expiration of the content referenced by the preview information approaches.

8. The method of claim 1, wherein a communication terminal is to present multiple prompts indicating that the bonus content associated with the content referenced by the preview information will expire and increasing a frequency at which the prompts are provided as the expiration of the bonus content approaches.

9. The method of claim 1 further comprising:

subscribing to a mobile broadcast content service of the broadcast content provider; and transmitting, to the broadcast content provider, an acknowledgement receipt that the content has been purchased, wherein the transmitting of the request comprises transmitting a request to purchase the content referenced by the preview information.

10. The method of claim 1, wherein the preview information comprises multimedia content.

11. The method of claim 1, wherein the expiration notification metadata comprises content expiration information.

12. A wireless communication terminal, comprising:

a broadcast content receiver to receive preview information for content not received by the wireless communication terminal and that is associated with bonus content that has limited availability and to receive the content referenced by the preview information and the bonus content in response a request for the content referenced by the preview information being transmitted before expiration of the limited availability;

a communication transceiver to receive, via a wireless communication network, expiration window information corresponding to the expiration of the limited availability of the bonus content, to receive an electronic service guide comprising expiration notification metadata for the content referenced by the preview information, and to transmit, via a proxy entity, the request for the content referenced by the preview information; and a user interface to present one or more prompts, wherein the wireless communication terminal is to:

decode and process the electronic service guide to determine whether the electronic service guide is valid, wherein the preview information is not to be displayed via the user interface until the electronic service guide is decoded and determined valid;

determine the content referenced by the preview information has not been consumed or purchased and that the limited availability is nearing expiration based on the expiration window information; and generate, based on the expiration notification metadata, one or more prompts indicating that the limited availability of the bonus content associated with the content referenced by the preview information is to expire in response to the determining the content referenced by the preview information has not been consumed or purchased and that the limited availability is nearing the expiration, wherein the one or more prompts are indicative of a content expiration time of future availability of the bonus content associated with the content referenced by the preview information, wherein a frequency at which the one or more prompts are presented increases as the content expiration time approaches.

13. The wireless communication terminal of claim 12, further comprising a controller communicably coupled to the broadcast content receiver and to the communication transceiver, wherein the controller is to present the one or more prompts on the user interface of the wireless terminal based on the expiration notification metadata.

14. The wireless communication terminal of claim 13, wherein the controller is to automatically present the one or more prompts on the user interface of the wireless terminal before expiration of the bonus content associated with the content referenced by the preview information based on the expiration notification metadata.

15. The wireless communication terminal of claim 13, wherein the controller is to automatically present the one or more prompts on the user interface of the wireless terminal after receipt of the expiration notification metadata.

16. The wireless communication terminal of claim 12, wherein the broadcast content receiver is a DVB-H compliant receiver and the communication transceiver is a cellular transceiver.

17. The wireless communication terminal of claim 12, wherein the preview information is referenced by the electronic service guide.

18. A method in a wireless communication network infrastructure entity, the method comprising:

receiving content expiration notification information for broadcast content available to a communication terminal in a wireless communication network corresponding to the wireless communication network infrastructure entity;

sending, to the communication terminal over the wireless communication network;

content preview information referencing broadcast content not yet received by the communication terminal and that is associated with bonus content that has limited availability;

an electronic service guide comprising content expiration notification metadata based on the content expiration notification information, wherein the electronic service guide is to be decoded and processed to determine whether the electronic service guide is valid, wherein the content preview information is not to be displayed via a user interface of the communication terminal until the electronic service guide is decoded and determined valid; and expiration window information corresponding to expiration of the limited availability of the bonus content, wherein the communication terminal is to present, via the user interface of the communication terminal, one or more prompts based on the content preview information, the content expiration notification metadata, and the expiration window information, wherein the one or more prompts are indicative of the expiration of the limited availability of the bonus content associated with the broadcast content which has not been consumed or purchased;

receiving, via a proxy entity from the communication terminal, a request for the broadcast content; and transmitting the broadcast content and the bonus content to the communication terminal in response to receiving the request before the expiration of the limited availability.

19. The method of claim 18, wherein the content expiration notification metadata is only for the content preview information received by the communication terminal.

20. The method of claim 18, wherein sending the content expiration notification metadata to the communication terminal comprises pushing the content expiration notification metadata to the communication terminal in absence of a request from the communication terminal.

* * * * *